US009543603B2

(12) United States Patent
Sato et al.

(10) Patent No.: US 9,543,603 B2
(45) Date of Patent: Jan. 10, 2017

(54) FUEL CELL SYSTEM AND CONTROL METHOD FOR FUEL CELL SYSTEM

(71) Applicant: NISSAN MOTOR CO., LTD., Yokohama-shi, Kanagawa (JP)

(72) Inventors: Masashi Sato, Yokohama (JP); Mitsunori Kumada, Yokosuka (JP); Shinichi Makino, Vancouver (CA)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 252 days.

(21) Appl. No.: 14/357,132

(22) PCT Filed: Nov. 1, 2012

(86) PCT No.: PCT/JP2012/078328
§ 371 (c)(1),
(2) Date: May 8, 2014

(87) PCT Pub. No.: WO2013/069534
PCT Pub. Date: May 16, 2013

(65) Prior Publication Data
US 2015/0004508 A1 Jan. 1, 2015

(30) Foreign Application Priority Data

Nov. 10, 2011 (JP) ................................. 2011-246626
Nov. 10, 2011 (JP) ................................. 2011-246628

(51) Int. Cl.
*H01M 8/04* (2016.01)
*H01M 8/02* (2016.01)
(52) U.S. Cl.
CPC ..... *H01M 8/04753* (2013.01); *H01M 8/04089* (2013.01); *H01M 8/04223* (2013.01);
(Continued)

(58) Field of Classification Search
CPC .................. H01M 8/04753; H01M 8/04552; H01M 8/04089; H01M 8/04225; H01M 8/04395
See application file for complete search history.

(56) References Cited

U.S. PATENT DOCUMENTS

| 7,482,074 B2 | 1/2009 | Yoshida et al. |
| 2006/0166056 A1 | 7/2006 | Nakamura et al. |

(Continued)

FOREIGN PATENT DOCUMENTS

| JP | 8-273684 A | 10/1996 |
| JP | 2007-109568 A | 4/2007 |

(Continued)

OTHER PUBLICATIONS

Supplementary European Search Report dated Sep. 10, 2014, 6 pgs.

*Primary Examiner* — Kenneth Douyette
(74) *Attorney, Agent, or Firm* — Foley & Lardner LLP

(57) ABSTRACT

In a fuel cell system that includes a fuel cell that generates power in response to an electrochemical reaction between hydrogen and oxygen contained in air, and a compressor that supplies air to the fuel cell, in which an idle stop is executed to stop power generation by the fuel cell when a required load falls to or below a predetermined value, and during the idle stop, air is supplied in accordance with a voltage condition between a cathode and a anode of the fuel cell, regardless of the required load, air is supplied during the idle stop while detecting an air supply amount, and when the air supply amount reaches a predetermined value, the air supply is stopped.

19 Claims, 18 Drawing Sheets

(52) U.S. Cl.
    CPC ... *H01M 8/04395* (2013.01); *H01M 8/04552* (2013.01); *H01M 8/04559* (2013.01); *H01M 8/04776* (2013.01); *Y02E 60/50* (2013.01)

(56) References Cited

U.S. PATENT DOCUMENTS

2006/0210849 A1* 9/2006 Bono .............. H01M 8/04097
                                                  429/429
2010/0273071 A1   10/2010 Yoshida et al.

FOREIGN PATENT DOCUMENTS

| JP | 4182732 A | 11/2008 |
|---|---|---|
| JP | 2009-152067 A | 7/2009 |
| JP | 2010-108755 A | 5/2010 |
| JP | 2010-244937 A | 10/2010 |
| JP | 2011-5427 A | 1/2011 |
| WO | WO 2005/015673 A1 | 2/2005 |
| WO | WO 2008/155629 A1 | 12/2008 |

* cited by examiner

FUEL CELL SYSTEM AND CONTROL METHOD FOR FUEL CELL SYSTEM

TECHNICAL FIELD

The present invention relates to control of an air supply in a fuel cell system.

BACKGROUND ART

A conventional fuel cell vehicle is installed with a fuel cell and a secondary battery that are used separately in an appropriate manner to supply power to a travel motor, enabling the fuel cell vehicle to travel. In this type of fuel cell vehicle, a so-called idle stop, in which power generation by the fuel cell is stopped such that the motor is driven by the secondary battery alone, may be executed during low load travel or the like, for example, in order to use fuel gas efficiently.

When a supply of air to the fuel cell is stopped continuously during an idle stop, however, a voltage of the fuel cell decreases. As the voltage decrease becomes greater, more time is required to raise the voltage to a voltage required to reactivate the fuel cell in response to a load increase or the like.

In JP4182732B, therefore, when a voltage of a fuel cell decreases to a predetermined value during an idle stop, air is supplied to restore the voltage of the fuel cell. Air is supplied only for a period set in advance on a timer or the like.

SUMMARY OF INVENTION

However, with a configuration in which the air supply period is set in advance, as in JP4182732B, it is impossible to respond to temporal variation such as an increase in pressure loss due to a filter blockage. Therefore, a situation in which an amount of air required to restore the voltage cannot be provided during the idle stop may arise.

Incidentally, variation in an air distribution among cells is conventionally believed to be a principle cause of variation in a voltage decrease speed after the air supply is halted in order to perform an idle stop. However, the present applicants have discovered that in actuality, variation in the voltage decrease speed increases when the amount of supplied air is insufficient.

With a configuration such as that of JP4182732B, therefore, when the air supply amount is insufficient, variation among the cells in the voltage decrease speed increases after the air supply is stopped. When, at a point where the voltage has decreased greatly, the fuel cell is reactivated in response to a load increase, causing a further voltage decrease, a cell in which the voltage decrease speed is particularly high may be diagnosed as having an excessively low voltage, and as a result, a failsafe mode may be activated.

Meanwhile, in a configuration such as that of JP4182732B, an excessive amount of air may be supplied as a result of individual differences due to variation in a manufacturing process or the like. For example, when control is performed to ensure that the voltage does not exceed an upper limit voltage, a time during which a current is caused to flow in order to maintain the upper limit voltage lengthens. As a result, surplus power is generated such that hydrogen is consumed wastefully. When control is performed to keep a current value during the idle stop constant, on the other hand, an excessive amount of air is supplied, leading to an increase in an overall voltage or an increase in a duration of a high voltage condition, and as a result, high potential deterioration advances.

An object of the present invention is therefore to provide a fuel cell system with which air can be supplied to each cell in an appropriate amount when supplying air in preparation of reactivation during an idle stop.

To achieve this object, the present invention is a fuel cell system having a fuel cell that generates power in response to an electrochemical reaction between hydrogen and oxygen contained in air, and a compressor that supplies air to the fuel cell, in which an idle stop is executed to stop power generation by the fuel cell when a required load falls to or below a predetermined value. During the idle stop, air is supplied in accordance with a voltage condition between a cathode and a anode of the fuel cell, regardless of the required load. Further, air is supplied during the idle stop while detecting an air supply amount, and when the air supply amount reaches a predetermined value, the air supply is stopped.

Details of the present invention as well as other features and advantages thereof are set forth in the following description of the specification and illustrated in the attached drawings.

DESCRIPTION OF EMBODIMENTS (First Embodiment)

Figure 1:
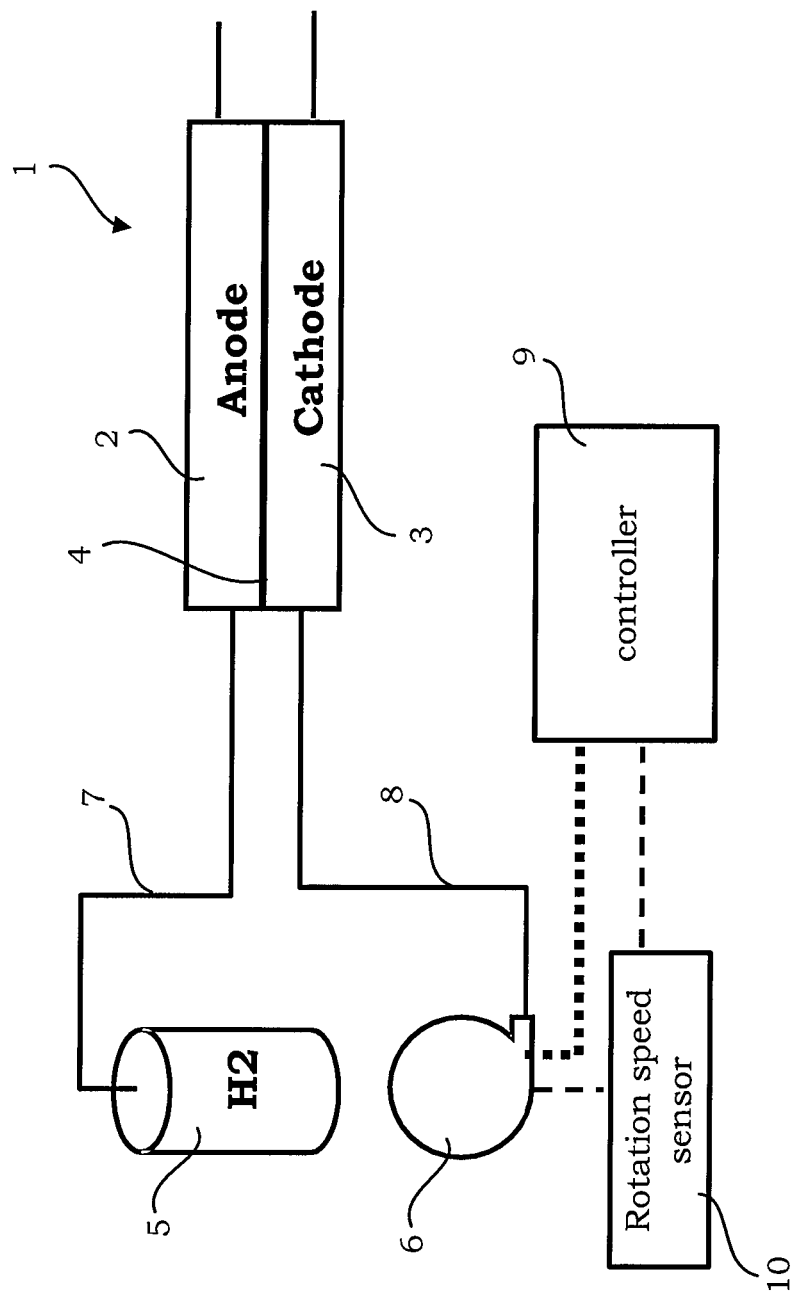
FIG. 1 is a view showing a system configuration according to a first embodiment of the present invention.

FIG. 1 is a view showing a system configuration according to a first embodiment of the present invention.

A fuel cell stack 1 is a direct current power supply constituted by a plurality of laminated single cells, each single cell being configured such that an electrolyte membrane 4 is sandwiched between an anode 2 and a cathode 3. It should be noted that FIG. 1 shows only one single cell.

Hydrogen gas is supplied to the anode 2 as a fuel from a hydrogen supply passage 7. Air is supplied to the cathode 3 as an oxidant gas from an air supply passage 8.

A pressure regulating valve, not shown in the figure, is interposed in the hydrogen supply passage 7. As a result, high pressure hydrogen in a hydrogen tank 5 is depressurized to a predetermined pressure and then supplied to the anode 2.

Air is supplied to the cathode 3 from the air supply passage 8 by a compressor 6. An air pressure in the cathode 3 is controlled by an air pressure regulating valve, not shown in the figure.

Driving of the compressor 6 is controlled by a controller 9 on the basis of a detection value from a rotation speed sensor 10 that detects a rotation speed of the compressor 6 and so on.

The controller 9 is constituted by a microcomputer including a central processing unit (CPU), a read only memory (ROM), a random access memory (RAM), and an input/output interface (I/O interface). The controller 9 may be constituted by a plurality of microcomputers.

Further, the controller 9 calculates a voltage of the fuel cell stack 1 and an average voltage of the single cells, and also specifies a minimum voltage and so on, on the basis of a detection value from a voltage sensor provided on each cell. It should be noted that the voltage sensor may be disposed on respective cell groups constituted by groups of a plurality of single cells rather than on each cell so as to calculate the voltage of the fuel cell stack 1 and an average voltage of the cell groups, and specify the minimum voltage and so on, on the basis of the cell group voltages.

The fuel cell system having the configuration described above is installed in a vehicle that travels using an electric motor as a drive source. A secondary battery is installed in the vehicle in addition to the fuel cell stack 1. Power generated by the fuel cell stack 1 is used to drive the electric motor, and also charged to the secondary battery. The controller 9 controls a power supply from the fuel cell system or the secondary battery to the electric motor in accordance with operating conditions.

When a required power is low, for example during low load travel, the controller 9 executes a so-called idle stop in which power generation by the fuel cell stack 1 is stopped temporarily so that the electric motor, accessories, and so on are driven using power from the secondary battery alone. The idle stop is terminated when a charge amount of the secondary battery falls below a predetermined threshold or the required power increases in response to an acceleration request or the like.

During the idle stop, the air supply to the cathode 3 is stopped. However, oxygen remaining in the cathode 3 is consumed in a reaction with hydrogen permeating the cathode 3, and therefore an overall stack voltage gradually decreases. Hence, as a duration of the idle stop lengthens, an amount of time required for the overall stack voltage to recover when returning from the idle stop increases, leading to an increase in a response delay to the acceleration request or the like.

Therefore, when the voltage of the fuel cell stack 1 decreases to a predetermined voltage set in advance during an idle stop, the controller 9 supplies air to the cathode 3 in order to restore the voltage.

Figure 2:
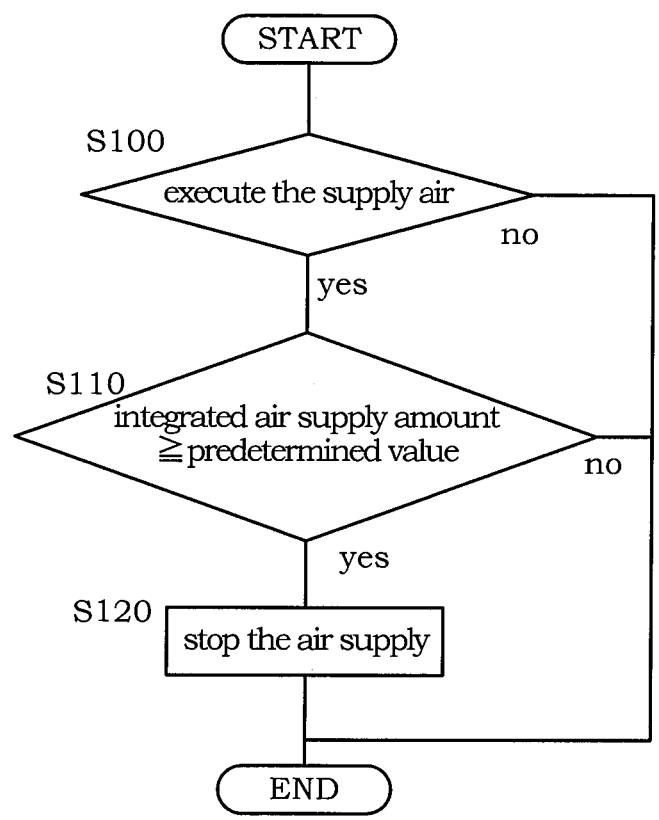
FIG. 2 is a flowchart showing an air supply control routine executed during an idle stop according to the first embodiment.

FIG. 2 is a flowchart showing an air supply control routine executed by the controller 9 during an idle stop. In other words, this control routine is executed on the assumption that an idle stop is underway in response to a reduction in a required load or the like. It should be noted that this control routine is executed repeatedly at intervals of approximately ten milliseconds, for example.

In a step S100, the controller 9 determines whether or not to supply air. More specifically, air is supplied when the voltage of the fuel cell stack 1 is lower than a preset air supply start voltage, and not supplied when the voltage is higher than the air supply start voltage. When air is not supplied, the current routine is terminated. When air is supplied, processing of a step S110 is executed.

In the step S110, the controller 9 determines whether or not an integrated air supply amount equals or exceeds a preset predetermined value. When the integrated air supply amount equals or exceeds the predetermined value, the air supply is stopped in a step S120, and in other cases, the current routine is terminated.

The integrated air supply amount is calculated by the controller 9 using a function having the detection value of the rotation speed sensor 10 and a supply time as parameters. For example, a discharge amount per unit time is calculated by multiplying a discharge amount per revolution of the compressor 6 by the detection value of the rotation speed sensor 10, and the integrated air supply amount is calculated by multiplying the supply time, which is measured by the controller 9, by the calculated discharge amount per unit time.

Here, for comparison, a case in which the air supply time is set on a timer will be considered. It may be thought that by calculating a time required to supply a required air amount on the basis of a designed discharge amount ($m^3$/min) of the compressor 6 and setting this time on a timer, the need to calculate the integrated air supply amount, as in this embodiment, is eliminated.

However, when an increase in pressure loss or the like occurs in an air supply system, the discharge amount of the compressor 6 decreases below the design value, and therefore the required air amount cannot be supplied in the time set on the timer. Conversely, when a flow passage resistance becomes smaller than a design value, an excessive amount of air is supplied.

In this embodiment, on the other hand, the integrated air supply amount is calculated on the basis of the actual rotation speed of the compressor 6 and the supply time, and therefore the required air amount can be supplied even when a deviation occurs from a design value due to pressure loss variation or the like.

Figure 3:
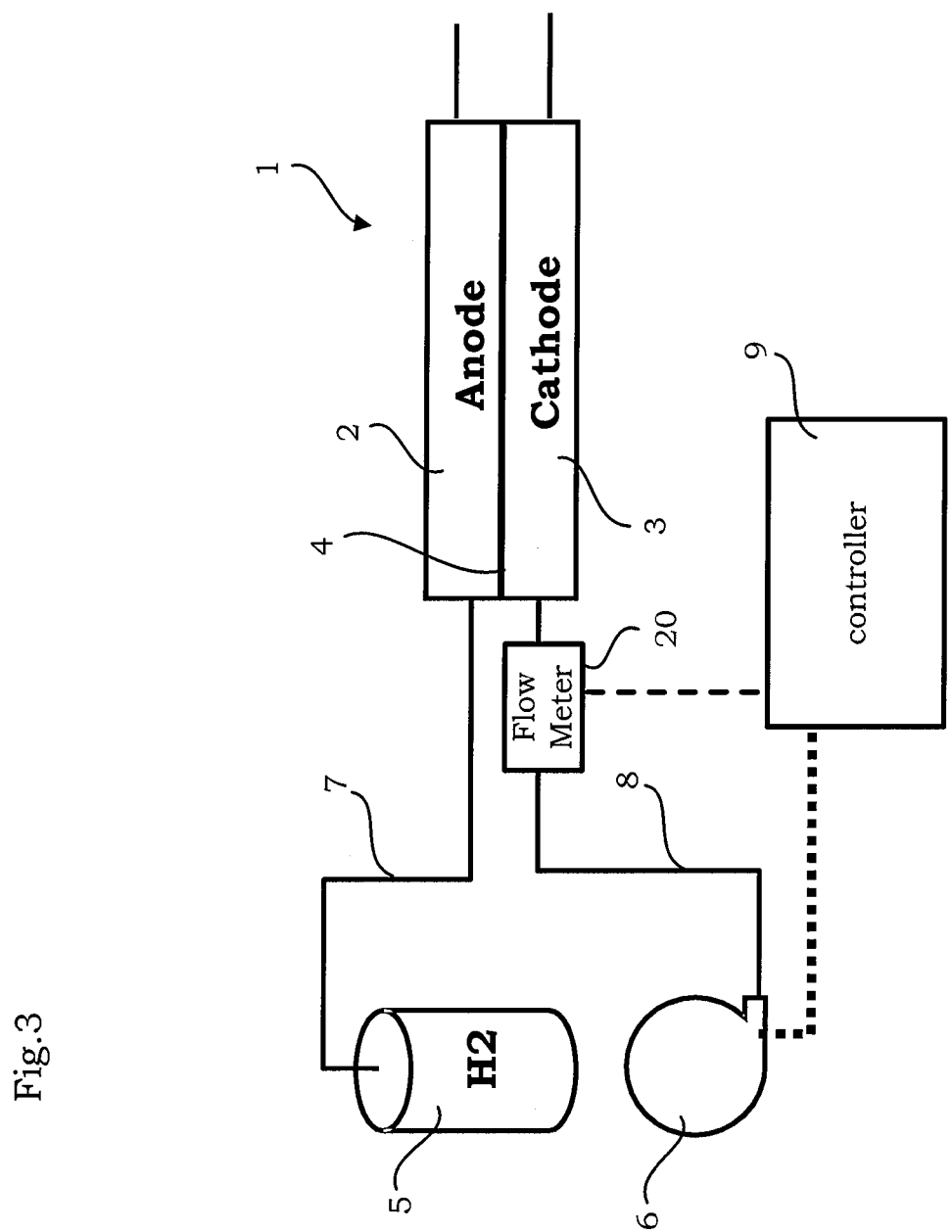
FIG. 3 is a view showing a system configuration in which a configuration for detecting an air supply amount is different.

As shown in FIG. 3, a flow meter 20 may be provided in the air supply passage 8 in order to detect a flow rate directly.

The preset predetermined value is a value that satisfies two following conditions. A first condition is an amount of air required to restore the voltage of the fuel cell stack 1 to a voltage at which the response delay when returning from an idle stop can be suppressed, and a second condition is an amount of air at which variation among the single cells in a voltage decrease speed can be suppressed.

Here, variation in the voltage decrease speed will be described.

In the fuel cell stack 1 constituted by a laminated body of single cells, variation in the voltage decrease speed occurs among the single cells following the start of an idle stop. If this variation is large, the voltage of a single cell having a relatively high voltage decrease speed is reduced greatly by the voltage decrease that occurs when returning from the idle stop, and as a result, the fuel cell stack 1 may be switched to a failsafe mode. Hence, variation in the voltage decrease speed is preferably minimized.

A magnitude of the variation in the voltage decrease speed is conventionally believed to be determined in accordance with variation in the amounts of air supplied to the single cells. In other words, it is believed that as long as the overall voltage of the fuel cell stack 1 recovers to a desired voltage, this indicates that the overall air supply amount of the fuel cell stack 1 is satisfied, even though the voltage decrease speed of a single cell having a small air supply amount increases.

It has been found, however, that in actuality, the magnitude of the variation among the single cells in the voltage decrease speed correlates more closely with the overall air supply amount of the fuel cell stack 1 than with variation in the amounts of air supplied to the single cells. In other words, when the overall air supply amount of the fuel cell stack 1 is insufficient, variation among the single cells in the voltage decrease speed increases.

It is therefore necessary to supply further air to suppress variation among the single cells in the voltage decrease speed even after the overall voltage of the fuel cell stack 1 has been restored to the desired voltage.

For this purpose, a value satisfying the two conditions described above is set by experiment or the like. More specifically, the value is set at or above an active area volume of all of the cells, for example. The active area volume is obtained by multiplying a height of an air flow passage contacting a reaction surface by an area of the reaction surface which is a surface of each single cell that contributes to power generation, and totaling a resulting value for the number of laminated cells. It should be noted that the active area volume includes a pore volume of a gas diffusion layer.

By supplying air in an amount equaling or exceeding the active area volume in this manner, a sufficient amount of air can be supplied to all of the single cells, whereby variation among the single cells in the voltage decrease speed can be suppressed. As a result, the likelihood of the fuel cell stack 1 being switched to the failsafe mode due to a voltage decrease in a specific single cell can be reduced.

Next, effects obtained when the control routine described above is executed will be described.

Figure 4:
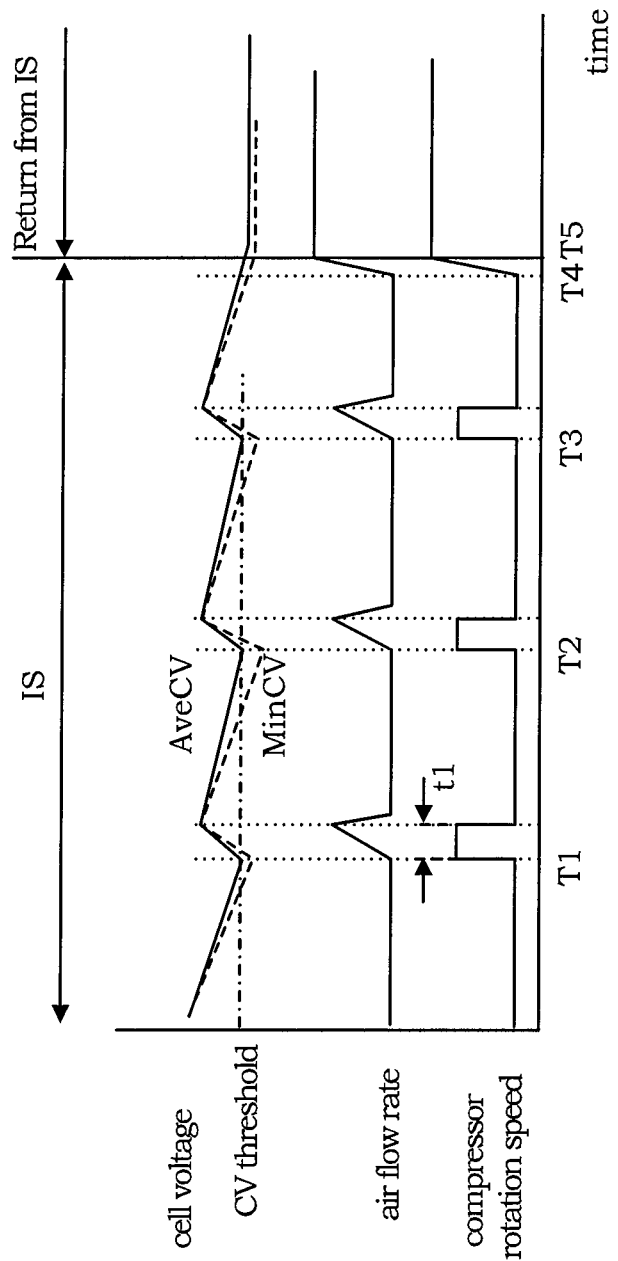
FIG. 4 is a time chart immediately after the start of use of a system in which an air supply time is fixed.
Figure 5:
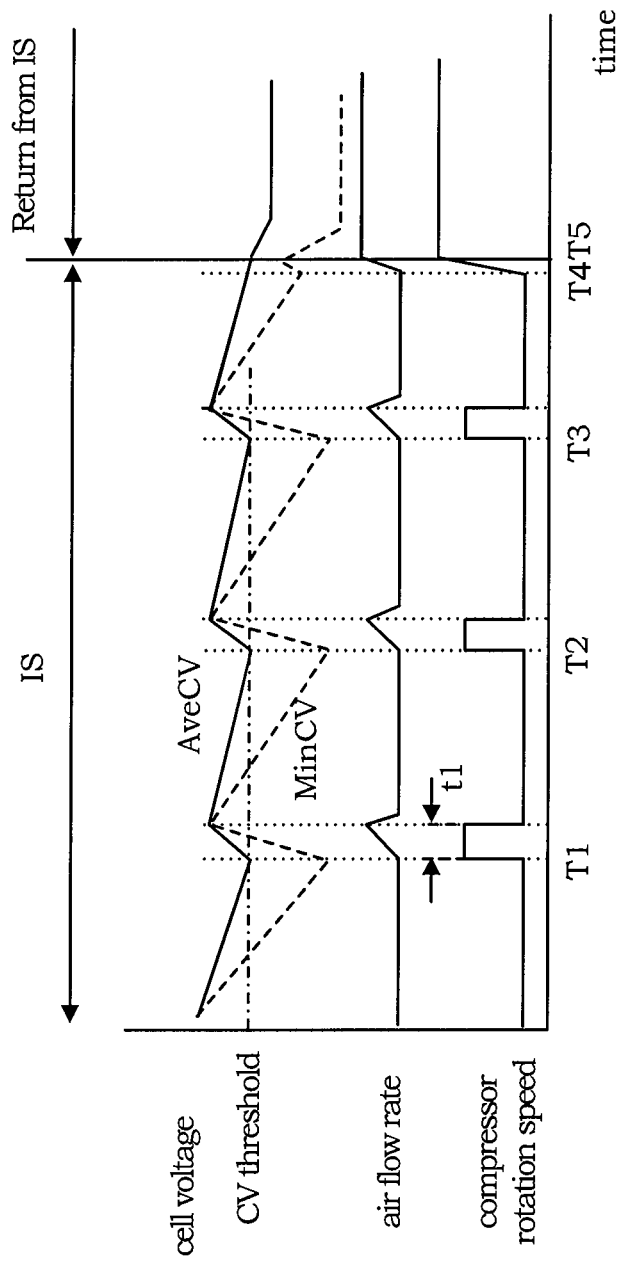
FIG. 5 is a time chart following temporal deterioration of the system in which the air supply time is fixed.

FIG. 4 is a time chart showing a condition immediately after the start of post-manufacture use of a configuration in which air is supplied for a preset time t1 during an idle stop. FIG. 5 is a time chart showing a condition in which pressure loss in a system having the same configuration has increased due to temporal deterioration and the like.

An average cell voltage AveCV is an average value of a cell voltage, which is calculated by the controller 9 on the basis of the cell voltage detection values of the respective single cells. A minimum cell voltage MinCV is a minimum value of the cell voltage, which is calculated by the controller 9 similarly.

When the average cell voltage AveCV falls below a CV threshold, air is supplied for the time t1. A timer counts the time t1. In FIGS. 4 and 5, air supply is started at timings T1, T2, T3. At a timing T4, the compressor 6 is driven in response to an increase in the required load, and at a timing T5, at which the compressor rotation speed increases to a rotation speed corresponding to the required load, the idle stop is terminated.

As shown in FIG. 4, immediately after the start of use, a voltage decrease speed difference between the average cell voltage AveCV and the minimum cell voltage MinCV is small. The reason for this is that when the compressor 6 is driven for the time t1, a designed amount of air is supplied to each single cell, and therefore voltage decrease speed variation among the single cells is small. Hence, the minimum cell voltage MinCV does not decrease greatly even when power supply to the load is resumed after returning from the idle stop.

When, on the other hand, pressure loss in the system due to temporal deterioration and the like increases, as shown in FIG. 5, an actual air flow rate when the compressor 6 is driven for the time t1 is smaller than the air flow rate immediately after the start of use. When a supply time set on a timer is employed, therefore, the air amount required for voltage recovery may not be supplied. When the air supply amount is insufficient, voltage decrease speed variation among the single cells increases. In other words, the decrease speed difference between the minimum cell voltage MinCV and the average cell voltage AveCV increases.

Hence, when returning from an idle stop in a reduced voltage condition, the minimum cell voltage MinCV decreases greatly due to the further voltage decrease that occurs upon resumption of the power supply to the load. When a single cell having an extremely low cell voltage exists, an abnormality may be diagnosed by a cell diagnosis device, and as a result, the fuel cell stack 1 may be switched to the failsafe mode.

In this embodiment, on the other hand, the air supply during an idle stop is controlled on the basis of the air flow rate, and therefore the amount of air required for voltage recovery can be supplied to each single cell even when pressure loss in the system increases.

Incidentally, adverse effects caused by managing the air supply during an idle stop on the basis of the operation time of the compressor 6 are not limited to the supply amount deficiency described above. For example, individual differences such as dimension variation occur among components, and these individual differences lead to air flow rate differences. Excessive air may therefore be supplied even when an optimum supply time is set during a design process on the basis of the air supply amount required for voltage recovery.

Figure 6:
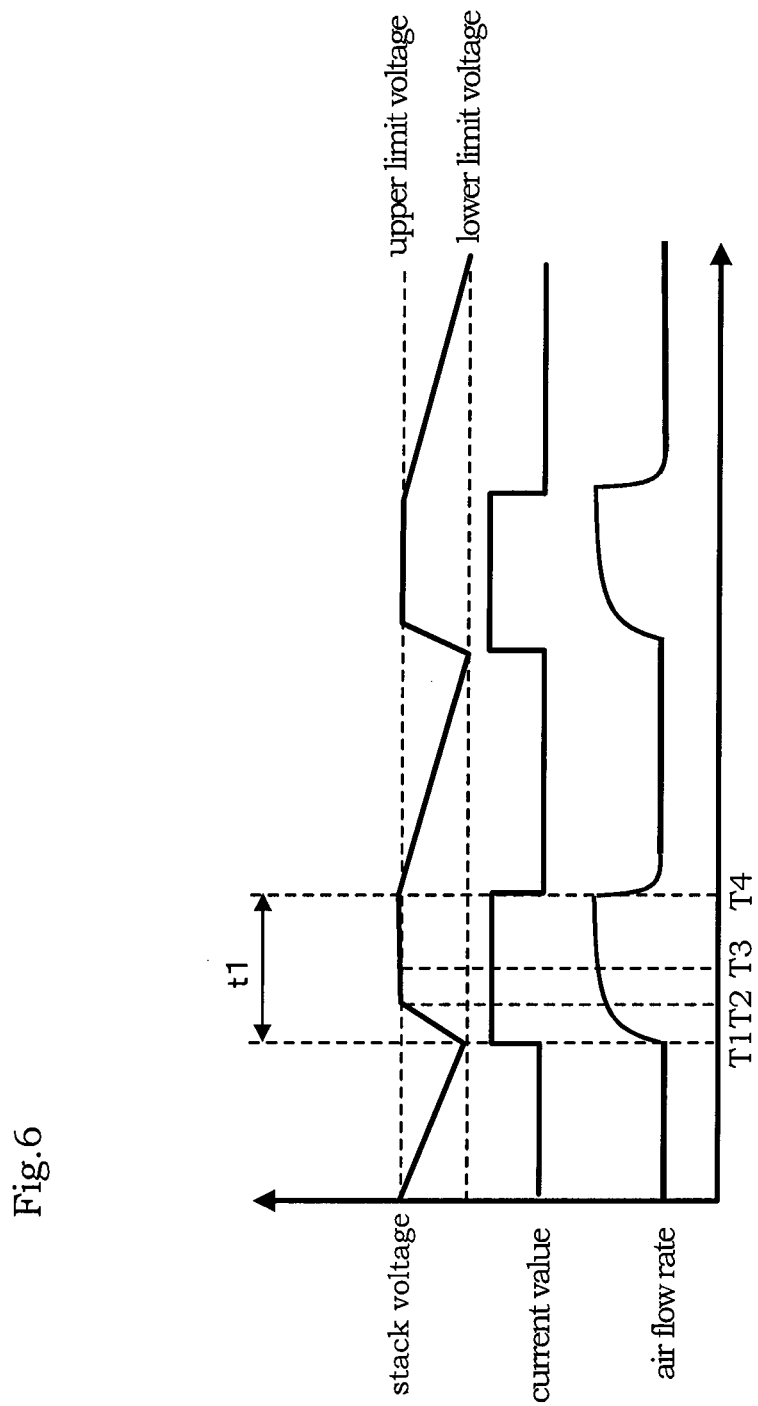
FIG. 6 is a time chart illustrating effects of the first embodiment when upper limit voltage control is performed.

FIG. 6 is a time chart showing a case in which the stack voltage of the fuel cell stack 1 is controlled so as not to exceed an upper limit value. More specifically, the stack voltage is prevented from exceeding the upper limit value by controlling a current magnitude. This control is known as upper limit voltage control. The upper limit value is set at a value at which high potential deterioration can be prevented. A time t1 in the figure is a supply time calculated during the design process on the basis of the air supply amount required for voltage recovery.

Air supply is started at a timing T1, at which the stack voltage falls to a lower limit voltage, and at a timing T2, the stack voltage reaches the upper limit voltage. At the designed air flow rate, the air amount required for voltage recovery is supplied by continuing to supply air until a timing T4. However, when a larger amount of air than the designed amount is supplied due to individual component differences and the like such that supply of the air amount required for voltage recovery is completed at a timing T3, air is supplied wastefully from the timing T3 to the timing T4, leading to wasteful power generation. As a result, hydrogen is consumed wastefully. Further, an amount of generated water increases, leading to an increase in the likelihood of a water blockage.

In this embodiment, on the other hand, an air supply stop timing during an idle stop is determined on the basis of the air flow rate, and therefore the air supply can be stopped at the timing at which supply of the air amount required for voltage recovery is completed, or in other words the timing T3 in FIG. 6. Hence, when the upper limit voltage control is performed, problems of wasteful hydrogen consumption and an increase in the likelihood of a water blockage due to surplus water generation do not arise.

Figure 7:
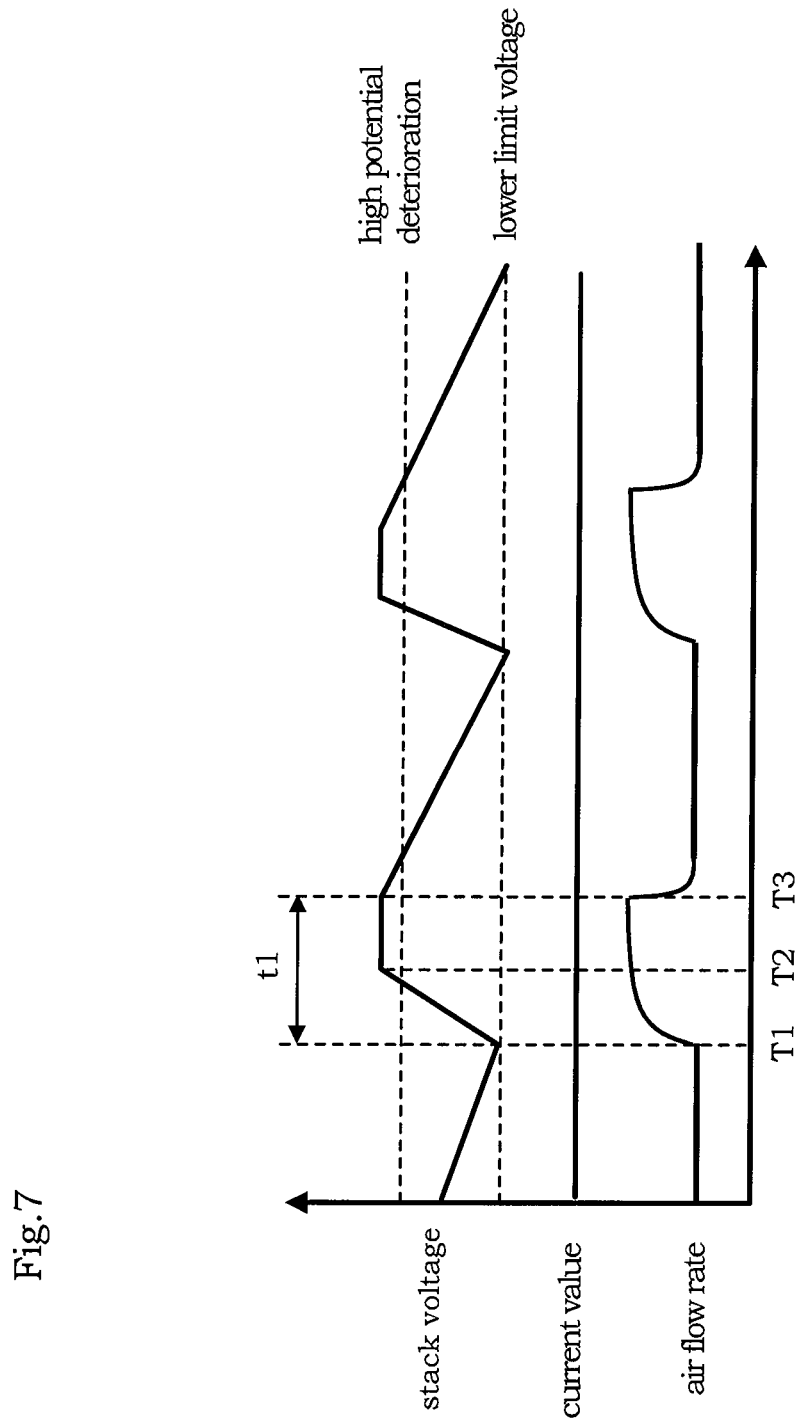
FIG. 7 is a time chart illustrating effects of the first embodiment when constant current control is performed.

FIG. 7 is a time chart showing a case in which a current value during an idle stop is controlled to be constant. More specifically, the current value is kept constant regardless of whether or not power generation is performed. This control is known as constant current control.

At the designed air flow rate, the air amount required for voltage recovery is supplied by continuing to supply air until a timing T3. However, when a larger amount of air than the designed amount is supplied due to individual component differences and the like such that supply of the air amount required for voltage recovery is completed at a timing T2, air is supplied wastefully from the timing T2 to the timing T3. Further, in a case where the voltage already exceeds a voltage at which high potential deterioration advances rapidly at the timing T2, as shown in FIG. 7, the air that is supplied from the timing T2 to the timing T3 simply advances the high potential deterioration of the fuel cell stack 1. Moreover, the amount of power consumed by the compressor 6 is increased to supply the unnecessary air.

In this embodiment, on the other hand, the air supply stop timing during an idle stop is determined on the basis of the air flow rate, and therefore the air supply can be stopped at the timing T2. Hence, advancement of high potential deterioration can be suppressed. Further, an increase in the power consumption of the compressor 6 can be prevented.

According to this embodiment, described above, following effects are obtained.

(1) The controller 9 is provided to supply air during an idle stop in accordance with a voltage condition between a cathode and a anode of the fuel cell stack 1 regardless of the required load, detect the integrated amount of the supplied air, and determine the air supply stop timing on the basis of the detection value. In other words, the air supply stop timing is determined on the basis of the actual amount of supplied air, and therefore air can be supplied in an appropriate amount even when temporal deterioration, component variation, and so on occur.

(2) The controller 9 detects the integrated air supply amount on the basis of a function having the detection value of the rotation speed sensor 10 and the supply time as parameters, and therefore the integrated air supply amount can be detected with a high degree of precision.

(3) Further, the integrated air supply amount may be detected by providing the flow meter 20.

(4) The controller 9 stops the air supply when the integrated amount of air supplied during the idle stop reaches the active area volume, and therefore an air supply amount corresponding to a design value can be guaranteed.

(Second Embodiment)

Figure 8:
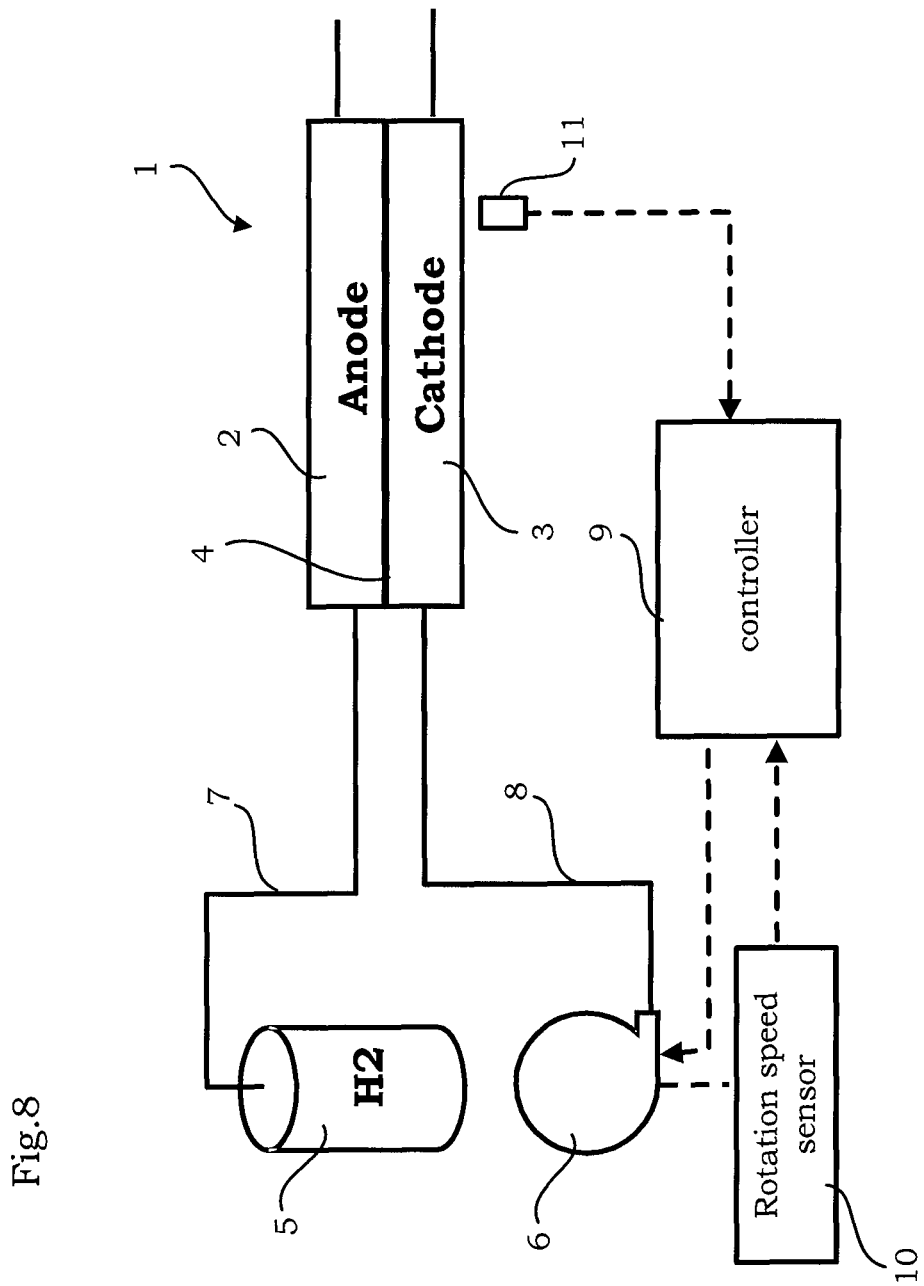
FIG. 8 is a view showing a system configuration according to a second embodiment.

FIG. 8 is a view showing a system configuration according to a second embodiment of the present invention.

Likewise in this embodiment, when the average voltage of the fuel cell stack 1 falls to a preset voltage V0 during an idle stop, the controller 9 supplies air to the cathode 3 in order to restore the voltage. It should be noted that an overall voltage may be calculated, and air may be supplied when the overall voltage falls to a predetermined voltage.

Incidentally, when the amount of air supplied to the fuel cell stack 1 is insufficient, voltage decrease speed variation among the single cells increases, leading to a decrease speed difference between the minimum voltage and the average cell voltage of the stack. In other words, an amount of oxygen remaining in the stack correlates closely with the cell voltage. Hence, the controller 9 performs air supply control during an idle stop on the basis of the cell voltage.

Figure 9:
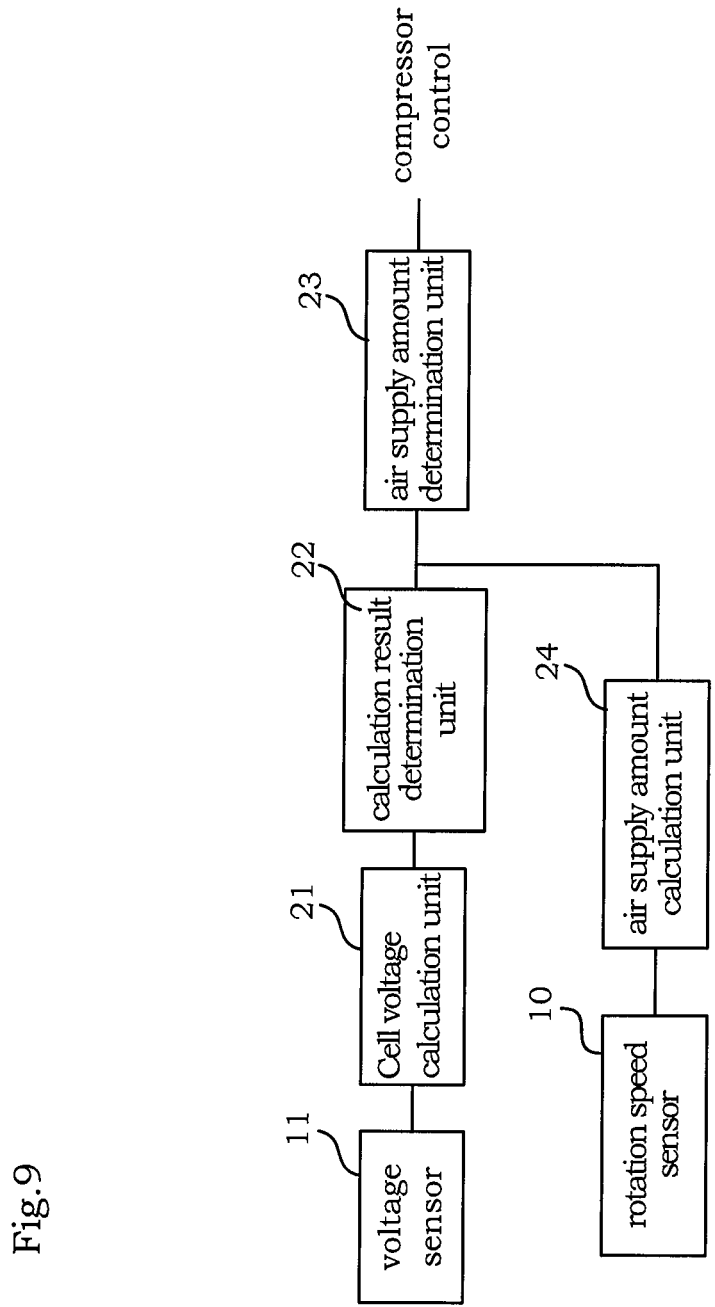
FIG. 9 is a control block diagram showing air supply control executed during an idle stop according to the second embodiment.

FIG. 9 is a control block diagram showing an outline of the air supply control executed by the controller 9 during an idle stop.

A detection value of a voltage sensor 11 is read by a cell voltage calculation unit 21, whereupon the average voltage of the fuel cell stack 1 and a voltage (referred to hereafter as the minimum voltage) of a cell having the lowest voltage in the stack are determined. On the basis of a calculation result obtained by the cell voltage calculation unit 21, a calculation result determination unit 22 determines whether an amount of charged air supplied during the idle stop is excessive, insufficient, or appropriate.

Meanwhile, an air supply amount calculation unit 24 calculates the amount of air supplied during the idle stop on the basis of the detection value of the rotation speed sensor 10.

An air supply amount determination unit 23 then determines a following air supply amount on the basis of the determination result indicating whether the air supply amount is excessive, insufficient, or appropriate and the calculation result obtained by the air supply amount calculation unit 24, and controls the compressor 6 accordingly. In other words, a determination as to whether or not a previous air supply amount was appropriate is made on the basis of the voltage during the idle stop, whereupon a current air supply amount is corrected. Specific calculations and so on will be described below with reference to FIG. 10.

Figure 10:
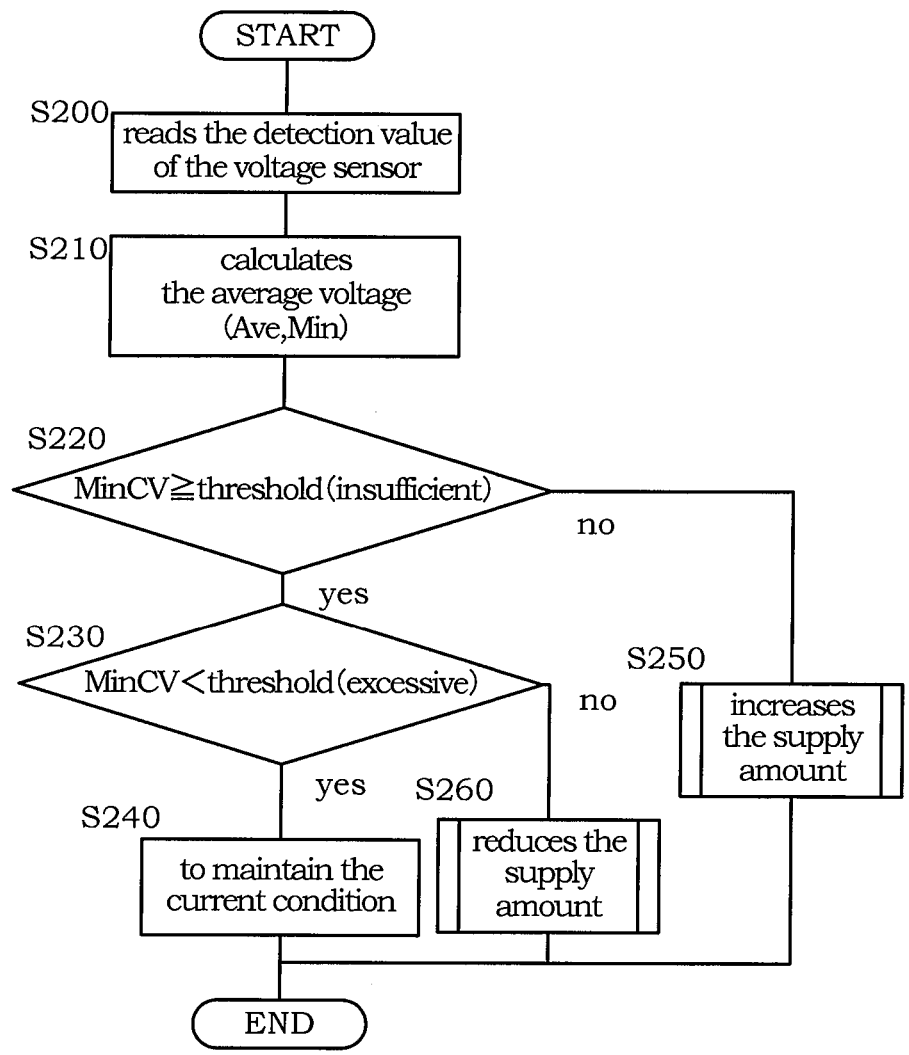
FIG. 10 is a flowchart showing air supply amount control according to the second embodiment.

FIG. 10 is a flowchart showing a control routine for determining the air supply amount, which is executed by the controller 9 in an air supply stop period during an idle stop. This control routine is executed when, during the air supply stop period, the average voltage or the overall voltage of the fuel cell stack 1 falls to a lower limit value for determining the start of air supply, or in other words immediately before the start of the air supply.

In steps S200 and S210, the controller 9 reads the detection value of the voltage sensor 11 and calculates the average voltage AveCV and the minimum voltage MinCV of the fuel cell stack 1.

In a step S220, the controller 9 determines whether or not the minimum voltage MinCV equals or exceeds a threshold Vb. The threshold Vb is a boundary value indicating whether or not the air supply amount is insufficient. When the minimum voltage MinCV equals or exceeds the threshold Vb, processing of a step S230 is executed, and when the minimum voltage MinCV is lower than the threshold Vb, or in other words when the air supply amount is insufficient, processing of a step S250 is executed.

Here, the minimum voltage MinCV is compared with the threshold Vb, but instead, a next lowest cell voltage to the minimum voltage MinCV may be determined in the step S210, and this Nth lowest voltage may be compared with the threshold Vb. In other words, any cell voltage from which the appropriateness of the air supply amount can be determined may be used. This applies likewise to the step S230 to be described below.

In the step S230, the controller 9 determines whether or not the minimum voltage MinCV is lower than a threshold Va. The threshold Va is a boundary value indicating whether or not the air supply amount is excessive. When the minimum voltage MinCV is lower than the threshold Va, processing of a step S240 is executed, and when the minimum voltage MinCV is equal to or higher than the threshold Va, or in other words when the air supply amount is excessive, processing of a step S260 is executed.

In the step S240, the controller 9 maintains the air supply amount in a current condition. The reason for this is that the previous air supply amount was appropriate.

It should be noted that during an initial calculation following system activation, the air supply amount is set at a value at least larger than the cathode active area volume. The active area volume is obtained by multiplying the height of the air flow passage contacting the reaction surface, which is the surface of each single cell that contributes to power generation, by the area of the reaction surface, and totaling the resulting value for the number of laminated cells. Further, the active area volume includes the pore volume of the gas diffusion layer. By supplying air in an amount that equals or exceeds the active area volume, a sufficient amount of air can be supplied to all of the single cells, whereby voltage decrease speed variation among the single cells can be suppressed. As a result, the likelihood of the fuel cell stack 1 being switched to the failsafe mode due to a voltage decrease in a specific single cell can be reduced.

Figure 11:
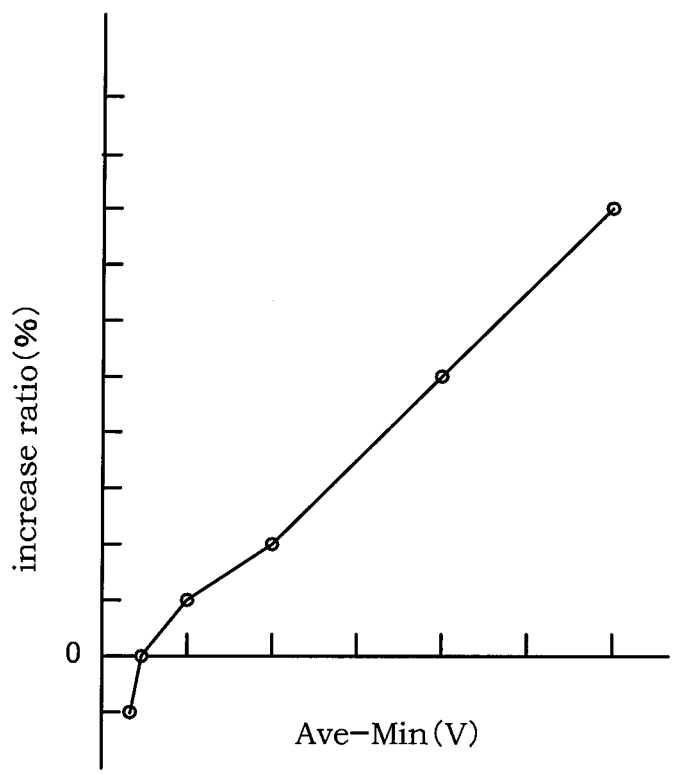
FIG. 11 is a table used to determine an increase correction amount.

In the step S250, the controller 9 increases the supply amount. More specifically, the controller 9 calculates the difference between the average voltage AveCV and the minimum voltage MinCV at the time of the determination as to whether or not the air supply amount is insufficient, sets an increase ratio by referring to a table such as that shown in FIG. 11, for example, and corrects the previous air supply amount using the increase ratio. The ordinate in FIG. 11 shows the increase ratio, and the abscissa shows the difference between the average voltage AveCV and the minimum voltage MinCV. As shown in FIG. 11, the increase ratio increases as the difference between the average voltage AveCV and the minimum voltage MinCV increases.

It should be noted that in a region where the difference between the average voltage AveCV and the minimum voltage MinCV is extremely small, the increase ratio takes a negative value, or in other words the air supply amount is reduced. This region serves as a decrease region used when the minimum voltage MinCV is higher than the threshold Va, or in other words in the step S260 described below. When the minimum voltage MinCV is lower than the threshold Vb, the decrease region is not used.

In the step S260, the controller 9 reduces the supply amount. More specifically, the controller 9 sets a decrease ratio by referring to a table such as that shown in FIG. 11, for example, and corrects the previous air supply amount using the decrease ratio.

From the viewpoint of improving control precision, the control routine described above is preferably performed immediately before the start of the air supply. However, the control routine may be executed at any time during the air supply stop period. In this case, the thresholds Va, Vb must be set at values corresponding to an execution timing.

Figure 12:
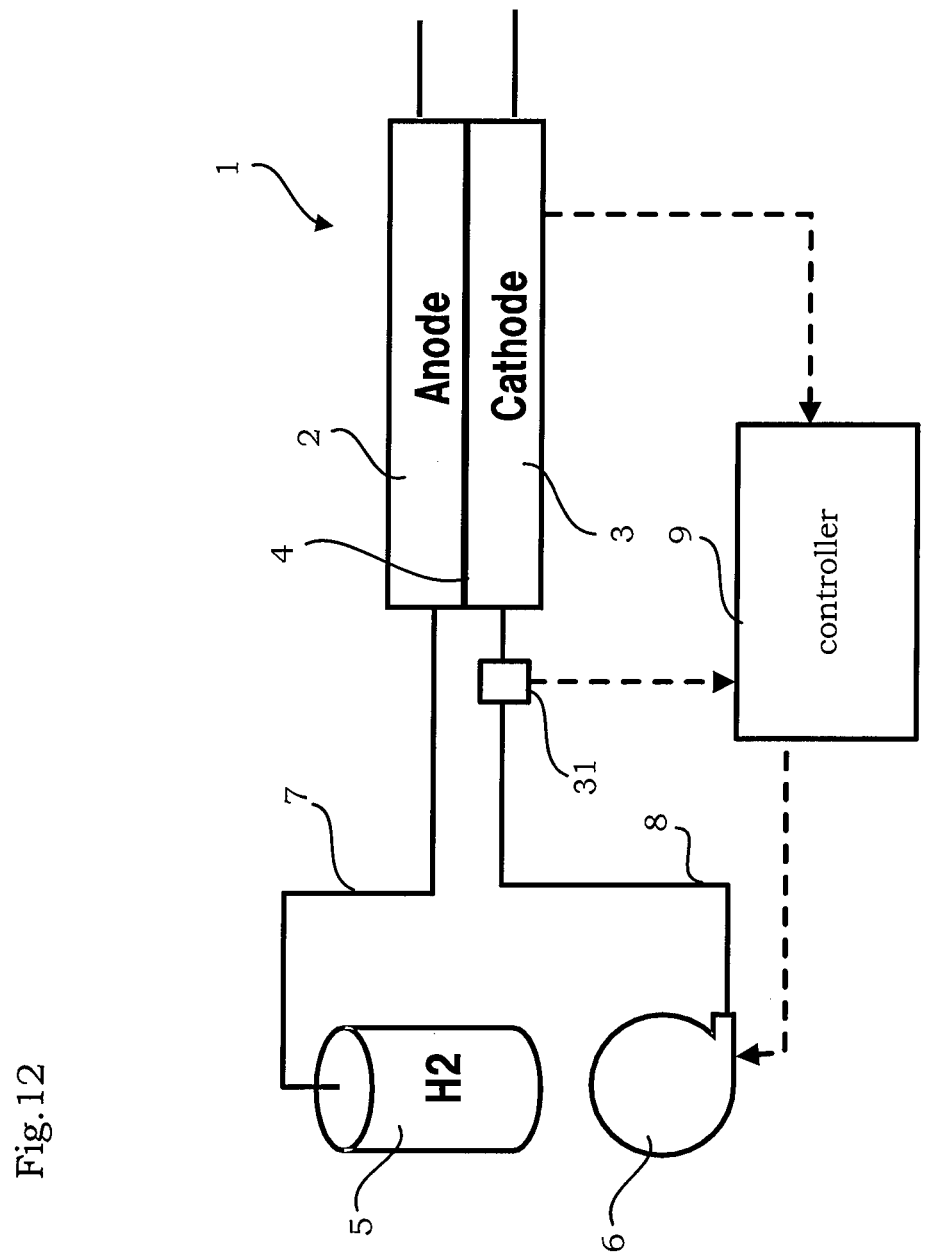
FIG. 12 is a view showing another example of the system configuration according to the second embodiment.

Further, the subject of the increase/decrease correction performed in the step S250 or the step S260 is not limited to the previous supply value. For example, a reference supply amount may be set at a fixed value, and this value may be subjected to increase/decrease correction. In this case, the rotation speed sensor 10 and the air supply amount calculation unit 24 are not required. As shown in FIG. 12, a flow meter 31 may be disposed in the air supply passage 8 to detect the air flow rate directly.

Figure 13:
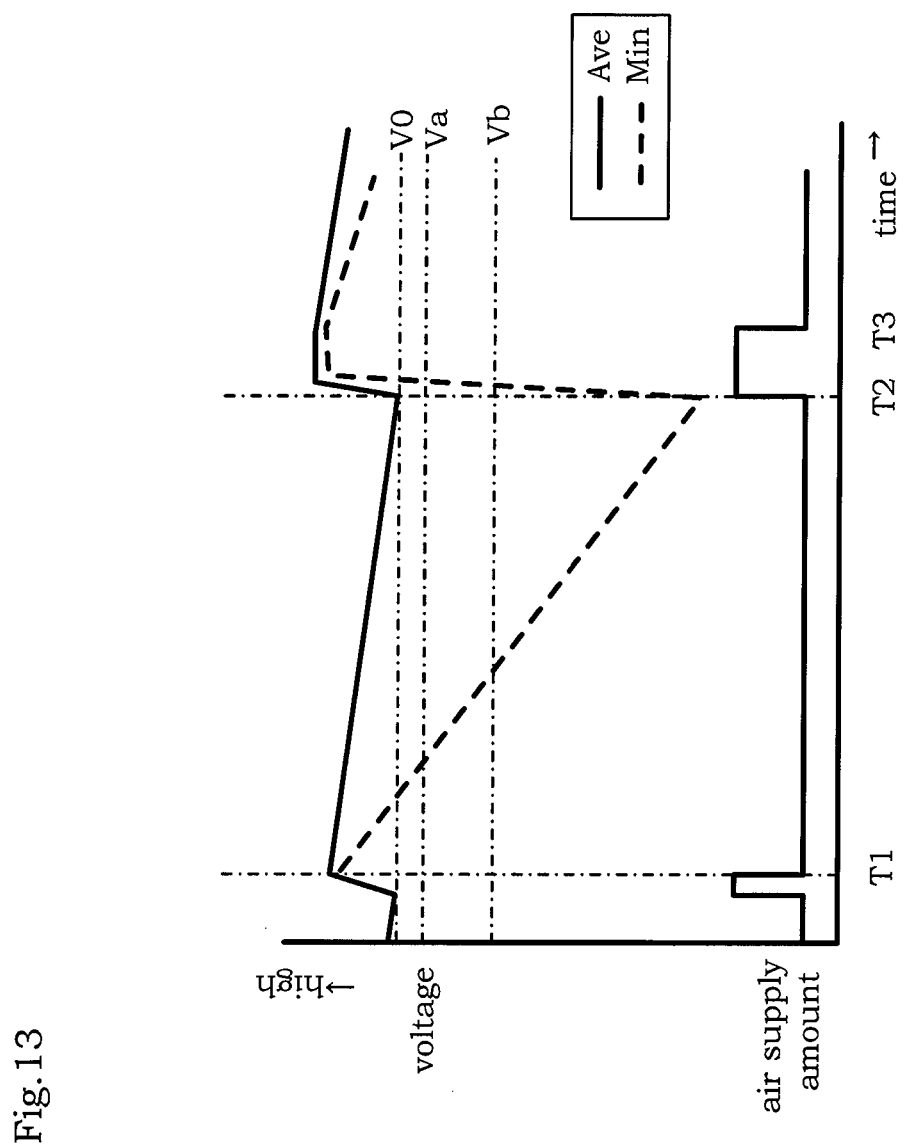
FIG. 13 is a time chart showing a case in which the control routine of FIG. 10 is executed.

FIG. 13 is a time chart showing a case in which the control described above is executed.

Here, the previous air supply ends at a timing T1, and an air supply stop section extends to a timing T2. When the air supply is stopped, the cell voltage begins to decrease, and when the average voltage AveCV reaches the threshold V0 at the timing T2, the air supply is resumed. At this time, the minimum voltage MinCV is lower than the threshold Vb, and therefore the air supply amount applied from the timing T2 is increase-corrected on the basis of the difference between the average voltage AveCV and the minimum voltage MinCV. As a result, air is supplied up to a timing T3.

The determination as to whether or not the previous supply amount was appropriate is ideally performed at the timing T2 immediately before the air supply is resumed, but may be performed before this. When the determination is performed before the timing T2, however, the thresholds Va, Vb must be set correspondingly.

Next, effects obtained by controlling the air supply amount as in this embodiment will be described.

When the amount of air supplied to the fuel cell stack 1 is insufficient, voltage decrease speed variation among the single cells increases. In other words, the decrease speed difference between the minimum voltage MinCV and the average voltage AveCV increases.

Therefore, when returning from an idle stop in a reduced voltage condition, the minimum cell voltage MinCV decreases greatly due to the further voltage decrease that occurs upon resumption of power supply to the load. When a single cell having a greatly reduced cell voltage exists, an abnormality may be diagnosed by a cell diagnosis device, and as a result, the fuel cell stack 1 may be switched to the failsafe mode.

In this embodiment, on the other hand, the air supply amount during an idle stop is controlled on the basis of the cell voltage, and therefore the amount of air required for voltage recovery can be supplied to each single cell. Hence, variation in the cell voltage decrease speed due to an insufficient charged amount can be suppressed. As a result, as shown in FIG. 13, variation in the voltage decrease speed from the timing T3 onward decreases, and therefore the switch to the failsafe mode described above can be prevented.

Figure 14:
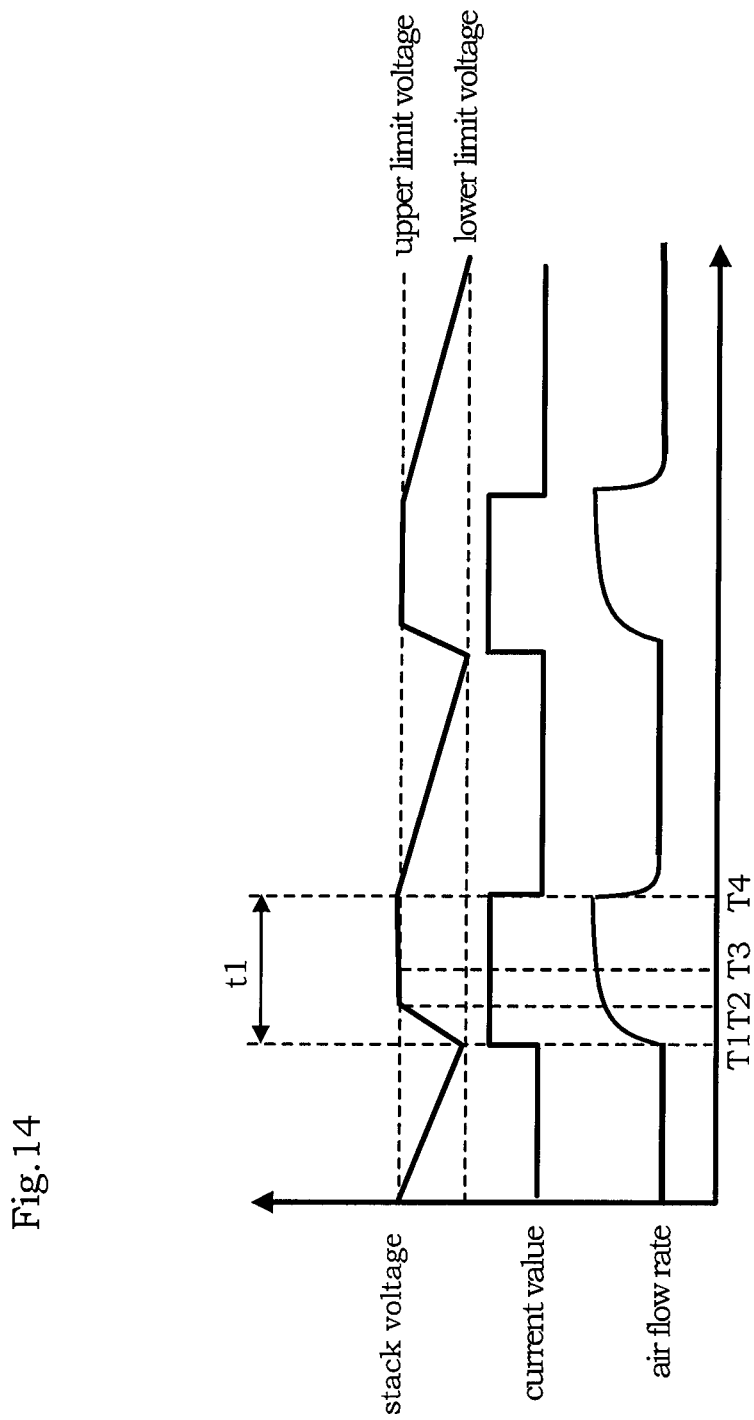
FIG. 14 is a time chart illustrating effects of the second embodiment when upper limit voltage control is performed.

Further, by correcting the amount of air supplied during the idle stop to an appropriate amount, an improvement in fuel efficiency can be achieved. FIG. 14 is a time chart showing a case in which control is performed to prevent the stack voltage of the fuel cell stack 1 from exceeding an upper limit value. More specifically, the stack pressure is prevented from the exceeding the upper limit value by controlling the current magnitude. This control is known as upper limit voltage control. The upper limit value is set at a value at which high potential deterioration can be prevented. A time t1 in the figure is the supply time calculated during the design process on the basis of the air supply amount required for voltage recovery.

Air supply is started at a timing T1, at which the stack voltage falls to the lower limit voltage, and at a timing T2, the stack voltage reaches the upper limit voltage. At the designed air flow rate, the air amount required for voltage recovery is supplied by continuing to supply air until a timing T4. However, when a larger amount of air than the designed amount is supplied due to individual component differences and the like such that supply of the air amount required for voltage recovery is completed at a timing T3, air is supplied wastefully from the timing T3 to the timing T4, leading to wasteful power generation. As a result, hydrogen is consumed wastefully. Further, the amount of generated water increases, leading to an increase in the likelihood of a water blockage.

In this embodiment, on the other hand, the air supply amount is determined to be excessive, insufficient, or appropriate in accordance with a behavior of the cell voltage, and the air supply amount is corrected on the basis of the determination result. Therefore, a more appropriate air supply amount is obtained. Hence, when the upper limit voltage control is performed, the problems of wasteful hydrogen consumption and an increase in the likelihood of a water blockage due to surplus water generation do not arise.

Figure 15:
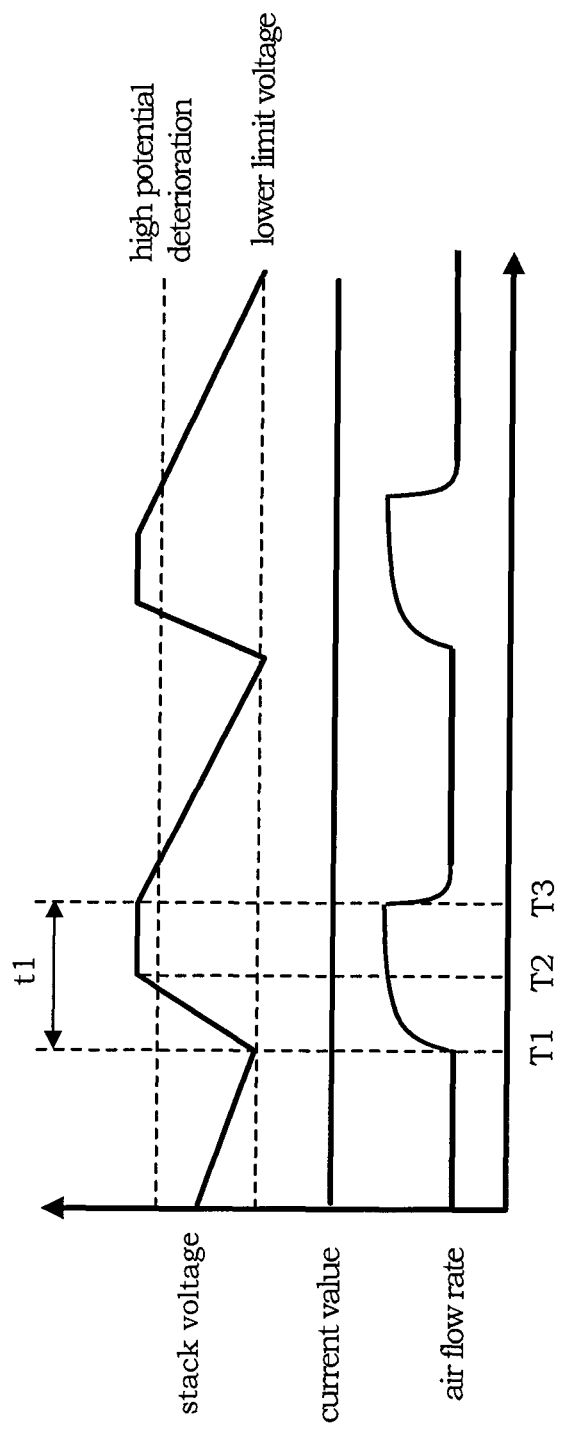
FIG. 15 is a time chart illustrating effects of the second embodiment when constant current control is performed.

FIG. 15 is a time chart showing a case in which the current value during an idle stop is controlled to be constant. More specifically, the current value is kept constant regardless of whether or not power generation is performed. This control is known as constant current control.

At the designed air flow rate, the air amount required for voltage recovery is supplied by continuing to supply air until a timing T3. However, when a larger amount of air than the designed amount is supplied due to individual component differences and the like such that supply of the air amount required for voltage recovery is completed at a timing T2, air is supplied wastefully from the timing T2 to the timing T3. Further, in a case where the voltage already exceeds a voltage at which high potential deterioration advances rapidly at the timing T2, as shown in FIG. 15, the air that is supplied from the timing T2 to the timing T3 simply advances the high potential deterioration of the fuel cell stack 1. Moreover, the amount of power consumed by the compressor 6 is increased to supply the unnecessary air.

In this embodiment, on the other hand, the air supply amount is determined to be excessive, insufficient, or appropriate in accordance with the behavior of the cell voltage, and the air supply amount is corrected on the basis of the determination result. Therefore, a more appropriate air supply amount is obtained. Hence, advancement of high potential deterioration can be suppressed. Further, an increase in the power consumption of the compressor 6 can be prevented.

Furthermore, in this embodiment, the air supply amount calculated on the basis of the rotation speed of the compressor 6 or the air supply amount actually measured by the flow meter 31 is subjected to increase/decrease correction, and therefore the amount of air supplied during an idle stop can be controlled with a higher degree of precision.

Moreover, the cell voltage, which correlates closely with the remaining oxygen amount in the stack, is used to estimate the internal condition of the stack, and therefore the internal condition of the stack can be estimated with a high degree of precision. Furthermore, the increase amount or decrease amount is adjusted on the basis of the estimation result, and therefore the air supply amount can be controlled more appropriately.

(Third Embodiment)

This embodiment is identical to the second embodiment in terms of the system configuration and the basic control routine, and differs only in the method of determining whether or not the amount of air supplied during an idle stop is appropriate. Hence, this difference will be described.

Figure 16:
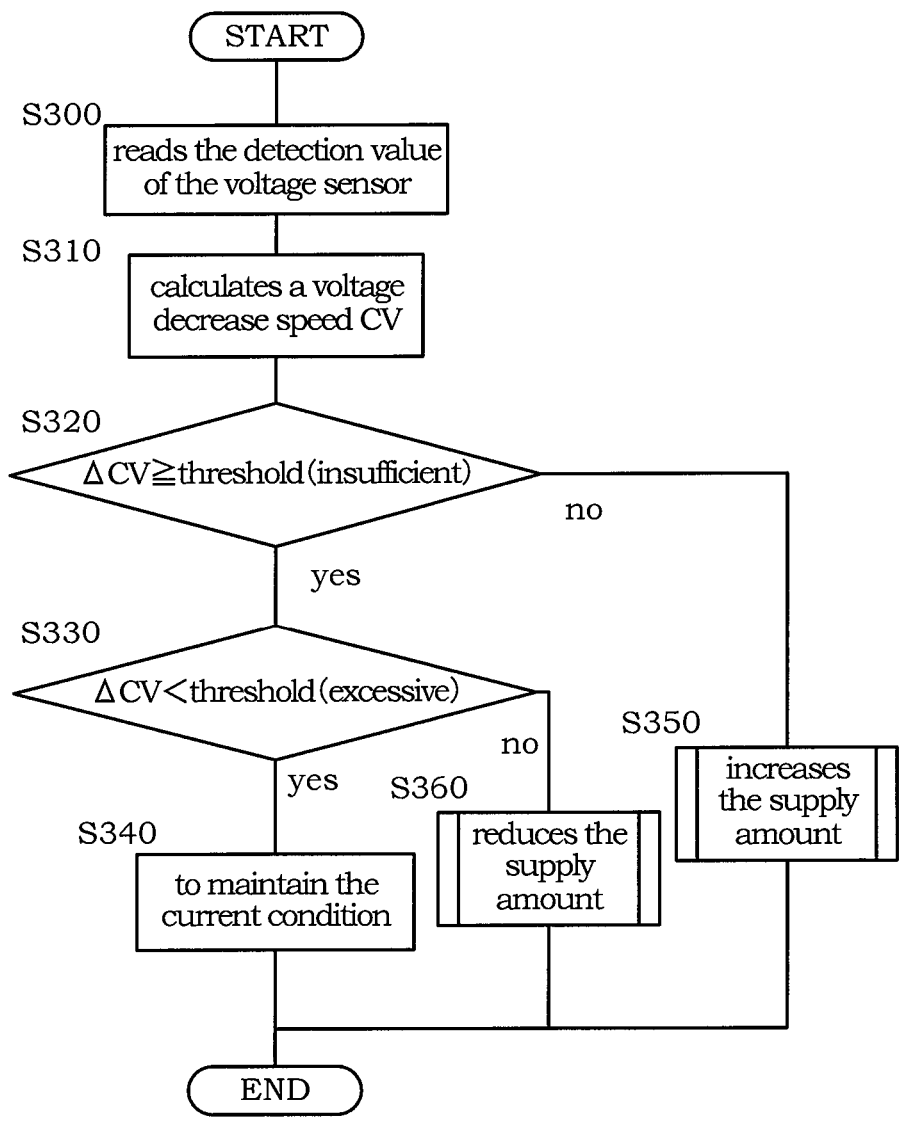
FIG. 16 is a flowchart showing air supply amount control according to a third embodiment.

FIG. 16 is a flowchart showing a control routine for determining the air supply amount, which is executed by the controller 9 according to this embodiment.

In a step S300, the controller 9 reads the detection value of the voltage sensor 11.

In a step S310, the controller 9 calculates a voltage decrease speed $\Delta CV$ of the minimum voltage MinCV. It should be noted that the voltage decrease speed $\Delta CV$ is set at an absolute value of the speed. In other words, the voltage decreases steadily more quickly as a value of the voltage decrease speed $\Delta CV$ increases.

In a step S320, the controller 9 determines whether or not the voltage decrease speed $\Delta CV$ equals or exceeds the threshold Vb. The threshold Vb is a boundary value indicating whether or not the air supply amount is insufficient. When the voltage decrease speed $\Delta CV$ is equal to or lower than the threshold Vb, processing of a step S330 is executed, and when the voltage decrease speed $\Delta CV$ is higher than the threshold Vb, or in other words when the air supply amount is insufficient, processing of a step S350 is executed.

In the step S330, the controller 9 determines whether or not the voltage decrease speed $\Delta CV$ is higher than the threshold Va. The threshold Va is a boundary value indicating whether or not the air supply amount is excessive. When the voltage decrease speed $\Delta CV$ is higher than the threshold Va, processing of a step S340 is executed, and when the voltage decrease speed $\Delta CV$ is equal to or lower than the threshold Va, or in other words when the air supply amount is excessive, processing of a step S360 is executed.

The steps S340 to S360 are identical to the steps S240 to S260 of FIG. 10, and therefore description thereof has been omitted.

As described above, according to this embodiment, similarly to the second embodiment, the amount of air supplied during an idle stop can be controlled appropriately.

It should be noted that a magnitude of a deviation between the average voltage AveCV and the minimum voltage MinCV may be used in place of the voltage decrease speed $\Delta CV$. In this case, the supply amount is increased when the deviation is larger than a deficiency determining threshold, reduced when the deviation is smaller than an excess determining threshold, and held in a current condition when the deviation is between the thresholds.

(Fourth Embodiment)

This embodiment is identical to the second embodiment in terms of the basic system configuration, but differs in that all amounts of air supplied during an idle stop are stored.

Figure 17:
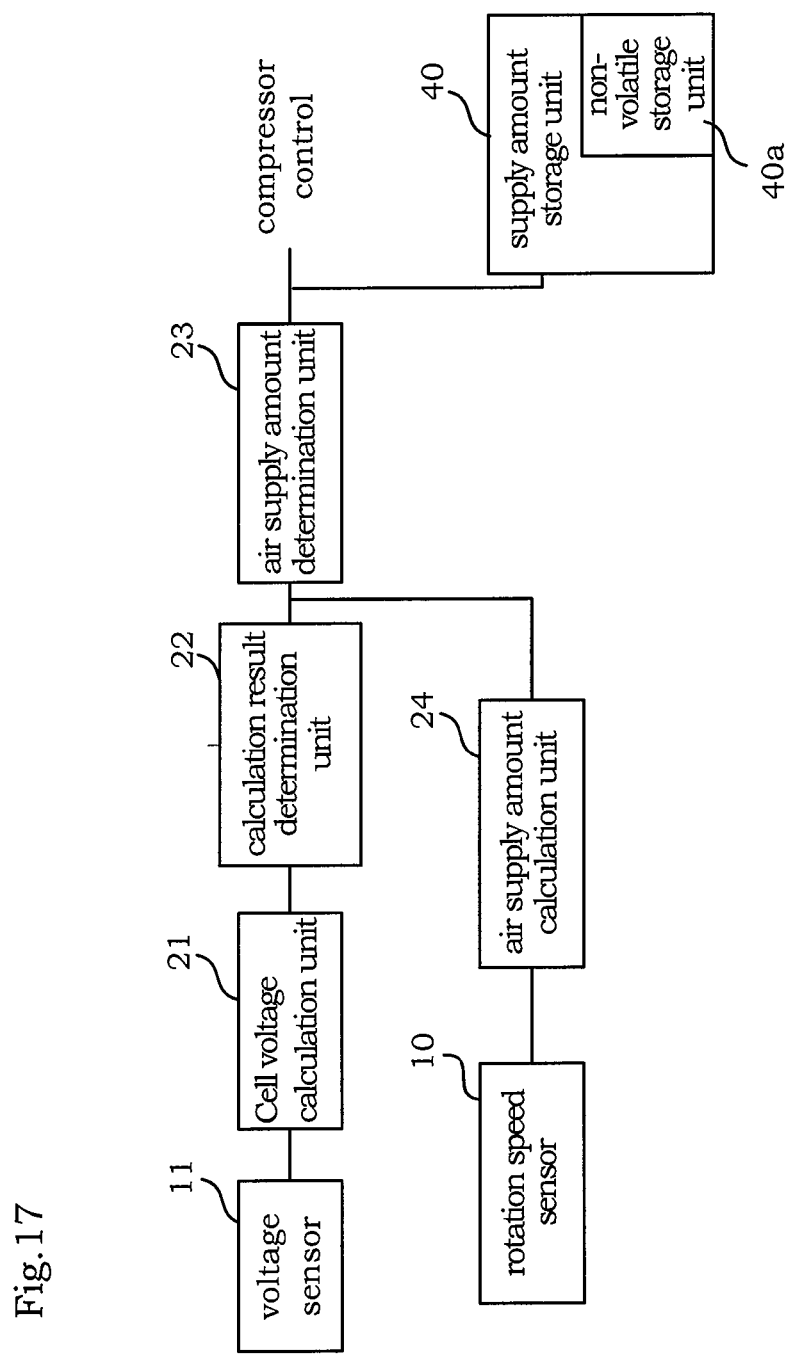
FIG. 17 is a control block diagram showing air supply control executed during an idle stop according to a fourth embodiment.

FIG. 17 is a control block diagram showing an outline of the air supply control executed by the controller 9 during an idle stop. As shown in FIG. 17, a supply amount storage unit 40 is provided to store the air supply amount determined by the air supply amount determination unit 23. In this second embodiment, the air supply amount determined by the air supply amount determination unit 23 is held only until a following calculation, but in this embodiment, the supply amount storage unit 40 stores at least the previous air supply amount and a last-but-one air supply amount.

Figure 18:
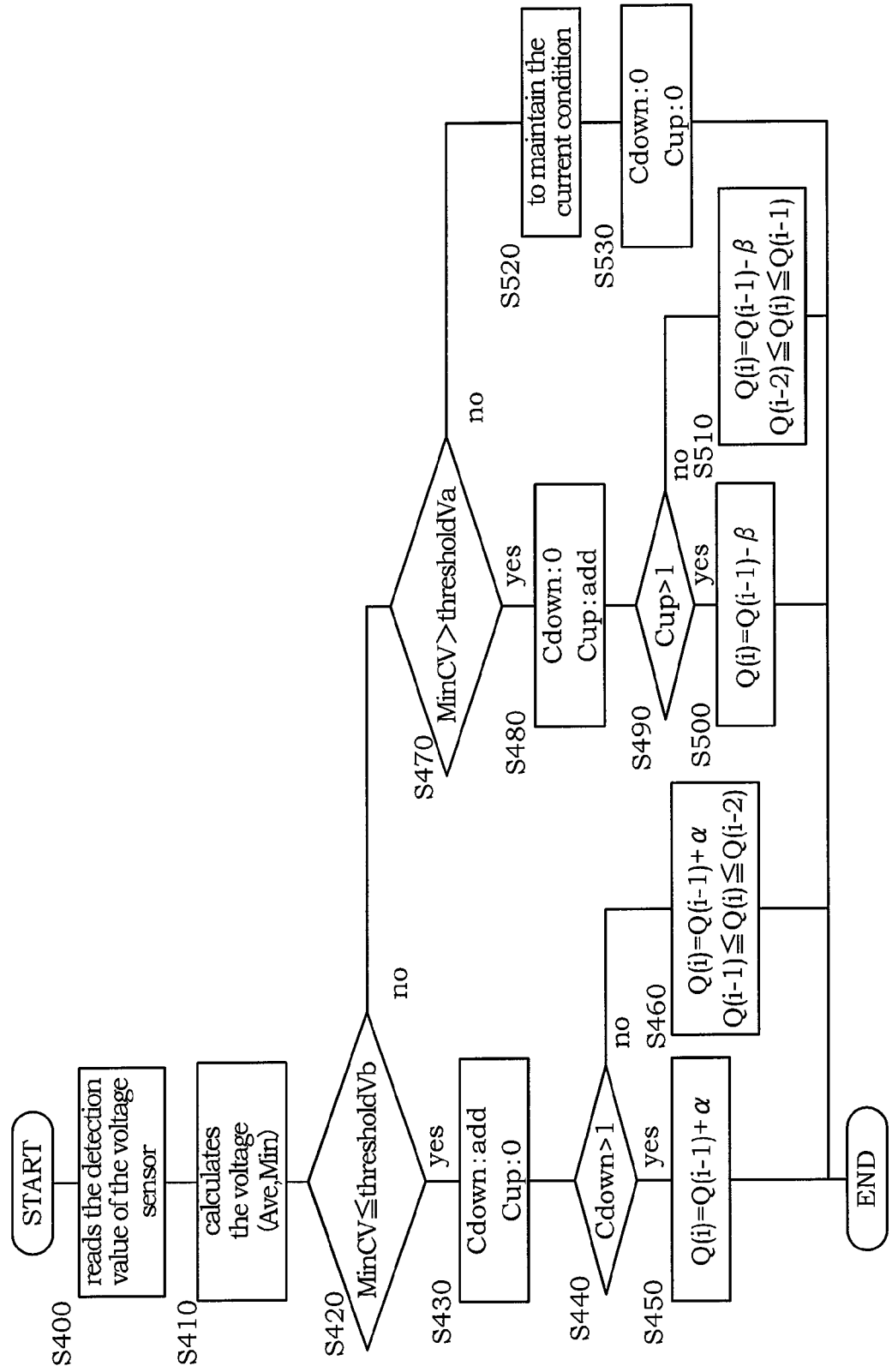
FIG. 18 is a flowchart showing air supply amount control according to the fourth embodiment.

FIG. 18 is a flowchart showing a control routine for determining the air supply amount, which is executed by the controller 9 according to this embodiment.

In steps S400 and S410, the controller 9 reads the detection value of the voltage sensor 11 and calculates the average voltage AveCV and the minimum voltage MinCV.

In a step S420, the controller 9 determines whether or not the minimum voltage MinCV is equal to or lower than the threshold Vb. The threshold Vb is a boundary value indicating whether or not the air supply amount is insufficient.

When the minimum voltage MinCV is equal to or lower than the threshold Vb such that the air supply amount is insufficient, processing of a step S430 is executed, and when the minimum voltage MinCV is higher than the threshold Vb, processing of a step S470 is executed.

In the step S430, the controller 9 adds 1 to a deficiency counter Cdown and sets an excess counter Cup at 0.

In a step S440, the controller 9 determines whether or not the deficiency counter Cdown is larger than 1. When the deficiency counter Cdown is larger than 1, processing of a step S450 is executed, and when the deficiency counter Cdown is equal to or smaller than 1, processing of a step S460 is executed.

In the step S450, similarly to the step S250 in FIG. 10, the controller 9 performs an increase correction on the previous supply amount. This may be expressed in the form of Equation (1) shown below. An increase amount α is a variable value that is set in a similar manner to the second embodiment.

$$Q(i) = Q(i-1) + \alpha \quad (1)$$

Q(i): air supply amount during $i^{th}$ air supply
α: increase amount

In the step S460, similarly to the step S450, the controller 9 performs an increase correction on the air supply amount. It should be noted, however, that the increase amount α is set such that the current air supply amount is equal to or larger than the previous air supply amount and equal to or smaller than the last-but-one air supply amount. The processing of the step S460 is performed in a case where the air supply amount is excessive and therefore subjected to a decrease correction, with the result that the air supply amount becomes insufficient, or in other words a case where the last-but-one air supply amount was insufficient and the previous air supply amount was excessive. As described above, therefore, the increase amount α is set such that the air supply amount is equal to or larger than the previous air supply amount and equal to or smaller than the last-but-one air supply amount.

In the step S470, the controller 9 determines whether or not the minimum voltage MinCV is higher than the threshold Va. When the minimum voltage MinCV is higher than the threshold Va, processing of a step S480 is executed, and when the minimum voltage MinCV is lower than the threshold Va, processing of a step S520 is executed.

In the step S480, the controller 9 sets the deficiency counter Cdown at 0 and adds 1 to the excess counter Cup.

In a step S490, the controller 9 determines whether or not the excess counter Cup is larger than 1. When the excess counter Cup is larger than 1, processing of a step S500 is executed, and when the excess counter Cup is equal to or smaller than 1, processing of a step S510 is executed.

In the step S500, the controller 9 performs a decrease correction on the previous supply amount, similarly to the step S260 of FIG. 10. This may be expressed in the form of Equation (2) shown below. A decrease amount β is a variable value that is set in a similar manner to the second embodiment.

$$Q(i) = Q(i-1) + \beta \quad (2)$$

Q(i): air supply amount during $i^{th}$ air supply
β: decrease amount

In the step S510, similarly to the step S500, the controller 9 performs a decrease correction on the air supply amount. It should be noted, however, that the decrease amount β is set such that the current air supply amount is equal to or larger than the last-but-one air supply amount and equal to or smaller than the previous air supply amount. The processing of the step S510 is performed in a case where the air supply amount is insufficient and therefore increased, with the result that the air supply amount becomes excessive, or in other words a case where the last-but-one air supply amount was insufficient and the previous air supply amount was excessive. As described above, therefore, the decrease amount β is set such that the air supply amount is equal to or larger than the last-but-one air supply amount and equal to or smaller than the previous air supply amount.

In the step S520, the controller 9 maintains the current air supply amount. In a step S530, the controller 9 sets both the deficiency counter Cdown and the excess counter Cup at 0.

Hence, in this control routine, when the minimum voltage MinCV is lower than the threshold Vb, increase corrections are performed repeatedly until the minimum voltage MinCV exceeds the threshold Va, and after the minimum voltage MinCV exceeds the threshold Va, the previous air supply amount is reduced. When the minimum voltage MinCV exceeds the threshold Va, on the other hand, decrease corrections are performed repeatedly until the minimum voltage MinCV falls below the threshold Vb, and after the minimum voltage MinCV falls below the threshold Vb, the previous air supply amount is increased.

As a result, the air supply amount is brought closer to an appropriate value every time air is supplied during an idle stop.

It should be noted that the air supply amount set according to this control routine is stored in a non-volatile storage unit 40a of the supply amount storage unit 40. In other words, the air supply amount subjected to increase/decrease correction according to this control routine is stored even after a current vehicle operation is terminated. The stored air supply amount is then used during the next vehicle operation. As a result, the air supply amount brought closer to the appropriate value during the current vehicle operation can be used from the start of the next vehicle operation.

Further, in this embodiment, the calculation result determination unit 22 determines whether the amount of charged air supplied during the idle stop is excessive, insufficient, or appropriate, but may determine only whether or not the amount of charged air supplied during the idle stop is excessive or whether or not the amount of charged air supplied during the idle stop is insufficient.

Embodiments of the present invention were described above, but the above embodiments merely illustrate a part of examples of applications of the present invention, and the technical scope of the present invention is not limited to the specific configurations described in the embodiments.

The present application claims priority based on Tokugan No. 2011-246626 and Tokugan No. 2011-246628, filed with the Japan Patent Office on Nov. 10, 2011, the entire contents of which are incorporated into this specification by reference.

The invention claimed is:

1. A fuel cell system comprising:
    a fuel cell that generates power by an electrochemical reaction between hydrogen and oxygen contained in air;
    a compressor that supplies air to the fuel cell; and
    a controller that is programmed to
        execute an idle stop that is to stop power generation by the fuel cell when a required load falls to or below a predetermined value, and
        supply, during the idle stop, air in accordance with a voltage condition between a cathode and an anode of the fuel cell, regardless of the required load, wherein the controller is further programmed to
detect a cell voltage or a cell group voltage,
calculate the voltage condition on the basis of a result of the detection,
determine as a calculation result determination, on the basis of a result of the calculation, whether a previous value of an air supply amount supplied intermittently to a cathode during the idle stop is excessive or insufficient,
decide to reduce or increase the air supply amount relative to a preset fixed value or a previous supply amount in accordance with a result of the calculation result determination, and
stop the air supply performed during the idle stop when the air supply amount reaches a predetermined value.

2. The fuel cell system as defined in claim 1, wherein the controller is further programmed to:
detect an integrated amount of the air supplied to the fuel cell; and
determine an end timing of the air supply performed during the idle stop on the basis of the detected integrated amount of the air supplied to the fuel cell.

3. The fuel cell system as defined in claim 2, further comprising:
a rotation speed sensor configured to detect a rotation speed of the compressor,
wherein the controller is further programmed to
detect an air supply time, and
detect the integrated amount of the air supplied to the fuel cell on the basis of a function having as parameters a detection value from the rotation speed sensor and the detected air supply time.

4. The fuel cell system as defined in claim 2, further comprising a flow meter that detects an air flow rate in a flow passage extending from the compressor to the fuel cell,
wherein the controller is further programmed to detect the integrated amount of the air supplied to the fuel cell on the basis of a detection value from the flow meter.

5. The fuel cell system as defined in claim 2, wherein the controller is further programmed to terminate the air supply performed during the idle stop when the integrated amount of the air supplied to the fuel cell during the idle stop reaches an active area volume, which is a sum of a volume of an air flow passage that faces an active area, the active area being an area of a laminated cell body constituting the fuel cell that performs power generation, and a pore volume of a gas diffusion layer of the active area.

6. The fuel cell system as defined in claim 1, wherein the controller is further programmed to determine the previous supply amount by calculation.

7. The fuel cell system as defined in claim 1, wherein the controller is further programmed to directly measure the previous supply amount.

8. The fuel cell system as defined in claim 6, wherein the controller is further programmed to
calculate a determination value that varies in accordance with voltage variation occurring while the air supply is stopped,
determine whether the fixed value or the previous supply amount is excessive, insufficient, or appropriate by comparing the determination value with a preset threshold, and
decide to increase the air supply amount relative to the fixed value or the previous supply amount when the fixed value or the previous supply amount is determined to be insufficient.

9. The fuel cell system as defined in claim 6, wherein the controller is further programmed to
calculate a determination value that varies in accordance with voltage variation occurring while the air supply is stopped,
determine whether the fixed value or the previous supply amount is excessive, insufficient, or appropriate by comparing the determination value with a preset threshold, and
decide to reduce the air supply amount relative to the fixed value or the previous supply amount when the fixed value or the previous supply amount is determined to be excessive.

10. The fuel cell system as defined in claim 6, wherein the controller is further programmed to vary an increase amount or a decrease amount applied to the fixed value or the previous supply amount in accordance with the result of the calculation result determination.

11. The fuel cell system as defined in claim 8, wherein, when the air supply amount is increased relative to the fixed value or the previous supply amount, the controller is further programmed to increase the increase amount as a divergence between the threshold and the determination value increases.

12. The fuel cell system as defined in claim 6, further comprising a storage unit configured to store at least a last-but-one supply amount and the previous supply amount of the air supply supplied during the idle stop.

13. The fuel cell system as defined in claim 12, wherein, when the controller determines that the fixed value or the previous supply amount is insufficient, the controller increases the air supply amount repeatedly until the determination result becomes excessive or appropriate.

14. The fuel cell system as defined in claim 13, wherein, when the determination result shifts from insufficient to excessive, controller reduces the air supply amount relative to the previous supply amount but sets the reduced air supply amount to be larger than the last-but-one supply amount.

15. The fuel cell system as defined in claim 12, wherein, when the controller determines that the fixed value or the previous supply amount is excessive, the controller reduces the air supply amount repeatedly until the determination result becomes insufficient or appropriate.

16. The fuel cell system as defined in claim 15, wherein, when the determination result shifts from excessive to insufficient, the controller increases the air supply amount relative to the previous supply amount but sets the increased air supply amount to be smaller than the last-but-one supply amount.

17. The fuel cell system as defined in claim 13, wherein the storage unit includes a non-volatile storage unit,
the non-volatile storage unit stores the air supply amount, and
the controller uses the air supply amount stored in the non-volatile storage unit during a following operation.

18. The fuel cell system as defined in claim 6, wherein the controller sets an air supply amount supplied during a first idle stop of an initial operation following manufacture of the system to be larger than an active area volume, which is a sum of a volume of an air flow passage that faces an active area, the active area being an area of a laminated cell body constituting the fuel cell that performs power generation, and a pore volume of a gas diffusion layer of the active area.

19. A control method of a fuel cell system having a fuel cell that generates power by an electrochemical reaction between hydrogen and oxygen contained in air, a compressor that supplies air to the fuel cell, and a controller, the method comprising:

executing, by the controller, an idle stop to stop power generation by the fuel cell when a required load falls to or below a predetermined value;

supplying, by the controller during the idle stop, air in accordance with a voltage condition between a cathode and an anode of the fuel cell, regardless of the required load;

detecting, by the controller, a cell voltage or a cell group voltage;

calculating, by the controller, the voltage condition on the basis of the detecting;

determining, by the controller, as a calculation result determination, on the basis of a result of the calculating, whether a previous value of an air supply amount supplied intermittently to the cathode during the idle stop is excessive or insufficient;

deciding, by the controller, to reduce or increase the air supply amount relative to a preset fixed value or a previous supply amount in accordance with a result of the calculation result determination; and stopping, by the controller, the air supply performed during the idle stop when the air supply amount reaches a predetermined value.

* * * * *